United States Patent [19]

Chapman

[11] 3,966,298
[45] June 29, 1976

[54] IMAGE DEROTATION DEVICE FOR RELAYING OPTICAL PATHS OFF OR ACROSS GIMBALS

[75] Inventor: Arthur S. Chapman, Rolling Hills, Calif.

[73] Assignee: Hughes Aircraft Company, Culver City, Calif.

[22] Filed: Dec. 6, 1974

[21] Appl. No.: 530,335

[52] U.S. Cl. .................................. 350/23; 350/52
[51] Int. Cl.² ........................................ G02B 23/02
[58] Field of Search .............................. 350/22–26, 350/52, 301, 287

[56] References Cited
UNITED STATES PATENTS

| | | | |
|---|---|---|---|
| 621,283 | 3/1899 | Pulfrich | 350/25 |
| 784,487 | 3/1905 | Goerz et al. | 350/23 |
| 1,006,230 | 10/1911 | Kollmorgen | 350/23 |
| 2,152,726 | 4/1939 | Baroni | 350/24 |
| 2,963,942 | 12/1960 | Montremy | 350/52 |
| 3,790,248 | 2/1974 | Kellow | 350/52 |

Primary Examiner—John K. Corbin
Assistant Examiner—Jon W. Henry
Attorney, Agent, or Firm—D. C. Keaveney; W. H. MacAllister

[57] ABSTRACT

There is disclosed a sighting device or system, such as a periscope having a gimballed objective lens, which includes means for relaying an optical image off of a gimballed portion of the sighting system to a fixed position eyepiece without incurring an image rotation about the line of sight as the objective is moved. The system includes a prism or V mirror assembly which is pivoted through its apex and which has its pivot axis aligned with but independent of the gimbal axis thereby permitting the gimbal axis to be located in the middle of two optical paths without interferring with either path. The mirror or prism assembly, forms a 90° V cross-section reflector having its axis of rotation aligned with the gimbal axis and perpendicular to the apex line formed by the intersection of its two plane reflecting surfaces. Each mirror preferably makes a 45° angle with the gimbal axis to which the two optical axes are parallel. The reflector assembly is programmed to move at half the angular rate of rotation of the gimballed sight.

10 Claims, 4 Drawing Figures

IMAGE DEROTATION DEVICE FOR RELAYING OPTICAL PATHS OFF OR ACROSS GIMBALS

BACKGROUND OF THE INVENTION

This invention relates to gimballed sighting devices such as periscopes, which may be used in tanks, submarines, or similar equipment provided with an optical sighting system which is normally rotatable at least in azimuth about a vertical gimbal axis and may also include a rotatable elevation mirror.

In previous devices of this type the optic axis of the optical system has been required to coincide with the mechanical axis of the azimuth gimbal in order to avoid rotation of the image. This places severe constraints upon the mechanical design and packaging of the system and on the means by which its gimbals can be provided.

It is an object of the present invention to provide such a device which permits the gimbal axis to be located parallel to and half way between two parallel optical paths so as not to interfere with either optical path and which still is able to relay the image to a fixed position optical sighting system without producing a rotation of the image as the gimballed objective is rotated.

SUMMARY OF THE INVENTION

The present invention achieves these objects by providing means to rotatably mount the gimballed portion of the system for rotation about a gimbal axis which is centrally located in the housing of the system and is parallel to and displaced from the optic axis of the objective lens means and associated optics in the gimballed portion of the system. The optic axis of the gimballed portion thus describes an arc of constant radius about the gimbal axis during the typically 180 degrees of permitted rotation in azimuth about the gimbal axis. The optic axis from the gimballed portion provides an optical path which leads from it to a V reflector type optical path folding means which is mounted for rotation not about the optical axis but about a projection of the gimbal axis itself. The path folding means is rotated independently of, but simultaneously with, the gimballed portion and rotates at an angular rate equal to half of the angular rate of rotation of the gimballed portion. At any point in its rotation the optical path folding means is positioned to lie on the optical axis from the objective lens. The optical path folding means consists of a reflector assembly comprising two plane reflecting surfaces intersecting each other at a 90° angle along a line forming an apex of the V cross section assembly which apex line intersects the gimbal axis at a 90° angle at the point of rotation of the path folding means. The optic path from the objective intersects one of the plane reflecting surfaces at an angle which is preferably 45°. That surface is positioned so that the optical path from the objective lens is folded by the first surface and directed to the other reflecting surface which again folds it so that it emerges in a direction parallel and opposed to the direction of the optical path along the optic axis of the gimballed portion of the system and is displaced therefrom. It can be shown that the optical path lengths through the V cross-section reflector assembly comprising the optical path folding means is the same in any given position of the path folding means for any point on the image. From the path folding means the image is transmitted to a fixed reflector surface on the fixed portion of the system which deflects it again 90° so that it may be conveniently brought out to a fixed position eyepiece.

BRIEF DESCRIPTION OF THE DRAWINGS

The above and other objects and advantages of the invention will be more readily apparent from the detailed description below taken in conjunction with the attached drawings wherein like reference characters refer to like parts throughout and in which.

DETAILED DESCRIPTION OF THE INVENTION

Figure 1:
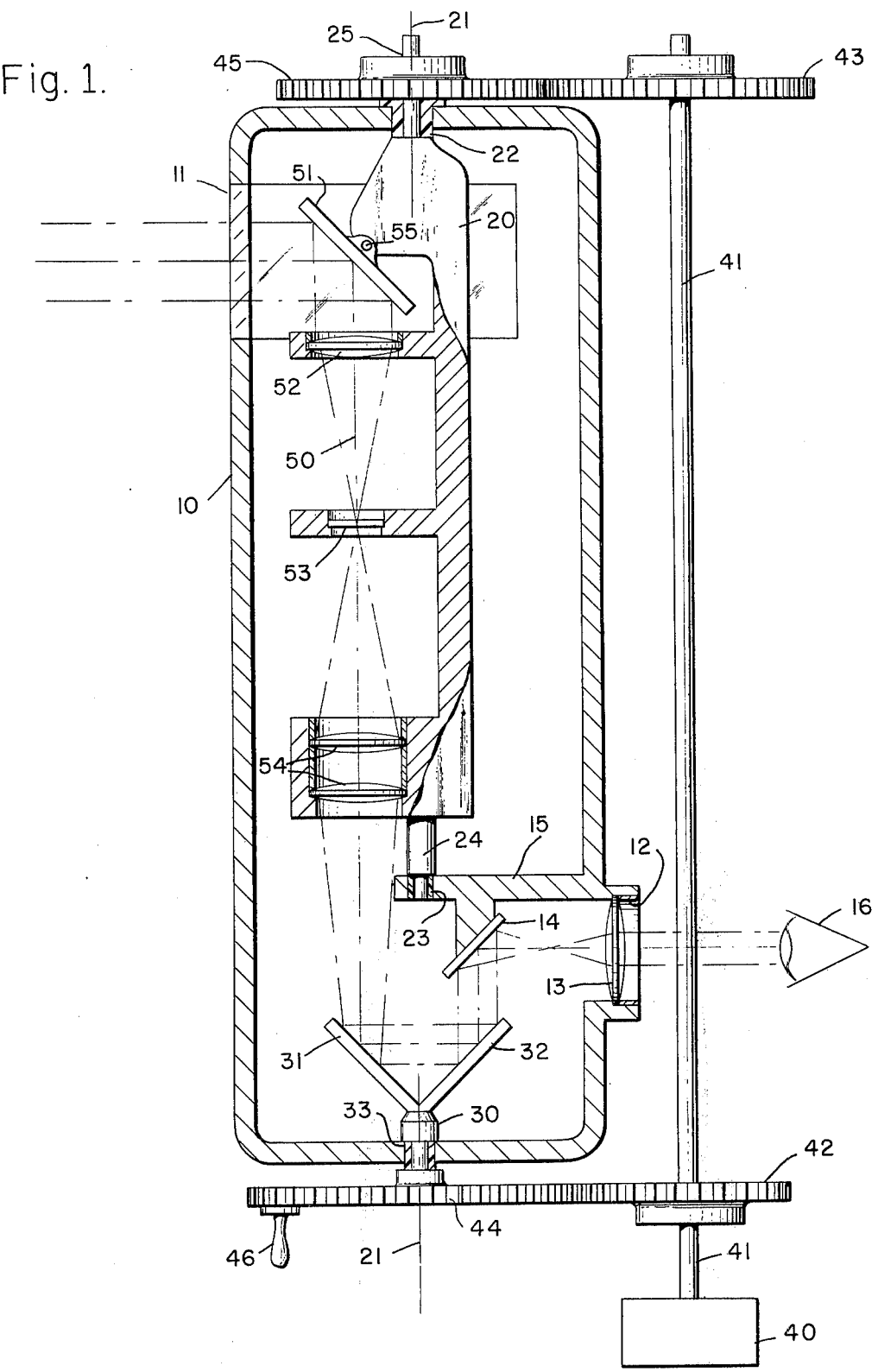
FIG. 1 is a schematic and diagrammatic sectional view through a tank periscope constructed in accordance with the present invention.

Turning now to the drawing, there is shown in FIG. 1, by way of example, a tank periscope having a generally right cylindrical housing 10 in the upper portion of which is formed an objective lens window 11 and in the lower portion of which is formed an eyepiece lens window 12. The cylindrical housing 10, the eyepiece window 12, the eyepiece lens 13, eyepiece folding mirror 14 and the inwardly projecting arm 15 from housing 10 on which mirror 14 is supported are all mounted to be rotationally fixed with respect to the tank or other vehicle in which the apparatus is to be used and to be fixed with respect to the eye 16 of an observor using the periscope. Any convenient and conventional means for mounting the housing 10 to the tank (not shown) may be used. These means may or may not include means for vertically raising or lowering the entire housing 10 (to which the other parts are affixed) in accordance with the needs of a particular installation.

The housing 10 supports and surrounds a centrally positioned gimballed lens support member 20 which supports the gimballed portion of the optical system and which is mounted for rotation about a gimbal axis 21 which is preferably the central vertical axis of symmetry of the vertical housing 10. Member 20 is mounted for rotation in azimuth about the vertical axis 21 by a first bearing member 22 in the top of the housing 10 and by a second bearing member 23 which is mounted in the arm 15 projecting into the lower portion of the housing 10. A first shaft portion 24 is integral with member 20 and has a reduced portion seated in bearing 23. A second shaft portion 25 is integral with the upper portion of number 20 and has a reduced portion seated in bearing 22 and extending therethrough to be integrally attached to a gearing member which is used to rotate the member 20 in a manner to be described below.

A second gimballed portion 30 of the system supports a mirror assembly comprising two plane parallel mirrors 31 and 32 which intersect each other at a 90° angle to form a mirror assembly having a V shaped cross-section, the apex of which is mounted to the shaft 30 which in turn is supported by a bearing member 33 in the bottom of housing 10 for rotation about the gimbal axis 21 which is an elongated projection of the axis 21 previously identified and about which the first gimballed member 20 rotates independently of the rotation of member 30.

Rotation of the first gimballed portion 20 and second gimballed portion 30 of the system may be produced by any convenient means suited for a particular installation so long as the means used assures that the first gimballed portion 20 will be rotated at an angular rate of rotation equal to twice the angular rate of rotation of the second gimballed portion 30. Alternatively stated, the second gimballed portion 30 must, in accordance with the present invention, rotate at an angular rate equal to one-half the angular rate of rotation of the first gimballed portion 20. The rotation may be produced either manually or by motor drive. By way of illustration in the present example there is shown a reversible direction DC motor 40 having an output shaft 41 which extends through and is integral with both a first driving gear 42 and a second driving gear 43 mounted for rotation by shaft 41 so that the gears 42 and 43, which need not be of the same size, do have the same angular rate of rotation. Gear 42 is mounted to mesh with and to drive a gear 44 which is integrally mounted to a reduced elongation of shaft 30 of the second gimballed portion. The gear 44 has a diameter equal to twice the diameter of gear 42 so that shaft 30 is rotated at half the angular rate of rotation of shaft 41.

Gear 43 is mounted to mesh and to rotate gear 45 which is integrally attached to the reduced shaft portion 25 which is integral with the first gimballed portion 20 mounted for rotation about gimbal axis 21. The gear 45 has the same diameter as the gear 43 so that the first gimballed portion 20 will be rotated at an angular rate which is equal to the angular rate of rotation of shaft 41 and which is therefore equal to twice the angular rate of rotation of shaft 30 driven by gear 44 as is required. Gear 44 may, if desired, be provided with a handle 46 for emergency manual operation. Any convenient support means may be used for the motor and drive mechanism.

Figure 4:
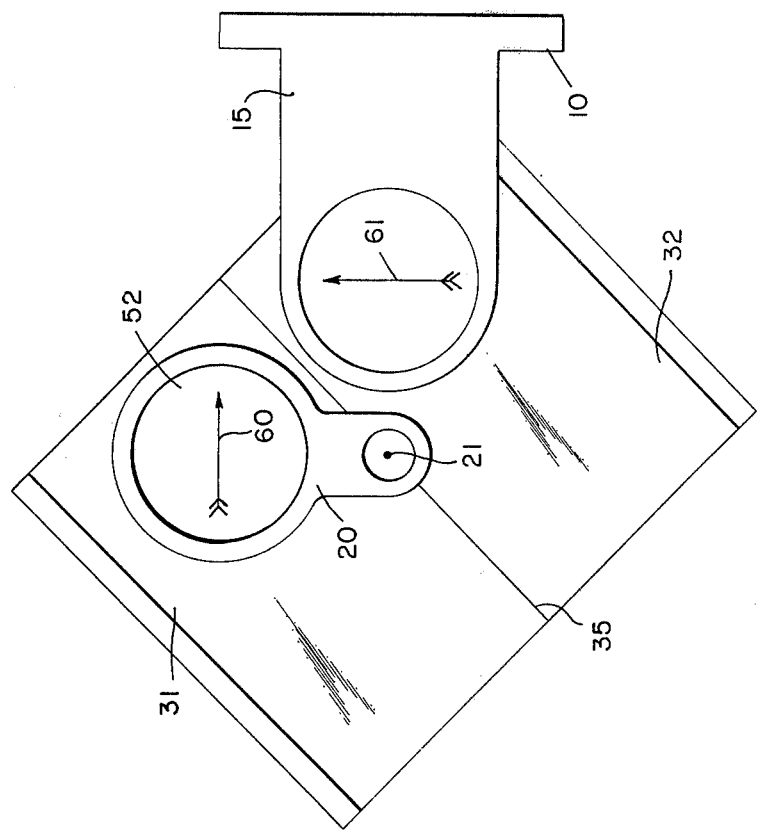
FIG. 4 is a view similar to FIG. 3 showing the periscope optics in a 90° right looking position.
Figure 3:
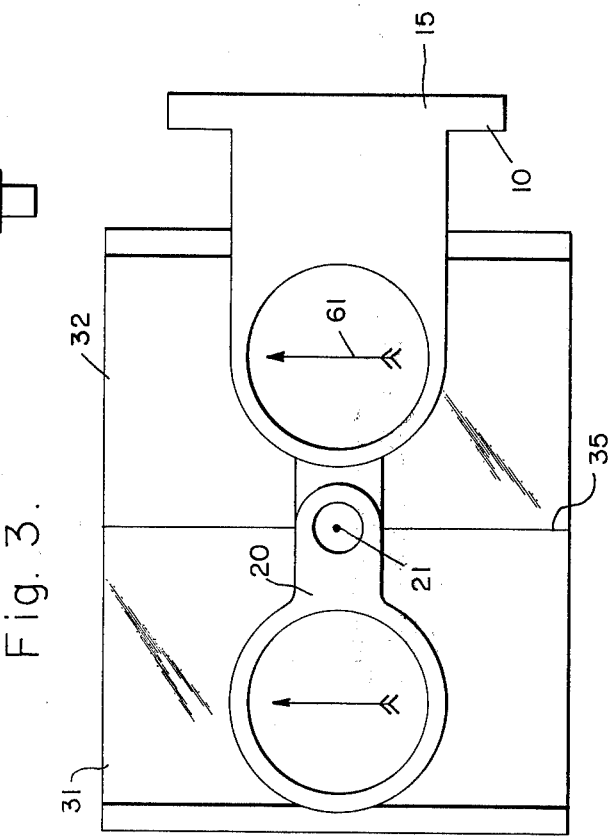
FIG. 3 is a diagrammatic view showing the lenses and folding reflector of the periscope in plan at 0° or straight ahead position.

In FIG. 1 the optical elements of the system are shown looking in the central or straight ahead position which is shown diagrammatically in plan view in FIG. 3. From this position the first gimballed member is in operation intended to be rotated by as much as 90° to either the left or the right by the means above discussed. Any suitable stop means to limit this motion may be used if desired. In FIG. 4 there is shown a diagrammatic plan view of the optical elements when the first gimballed member 20 has been rotated by 90° to the right.

The optical elements which are mounted in fixed relationship to the first gimballed portion 20 are positioned along a first portion of optic axis 50 and comprise an elevation pointing mirror 51, an objective lens 52, a target reticle 53 which is positioned at a focal point of objective lens 52, and relay optics 54. The elevation pointing mirror 51 is shown in the 45° position in which it serves to fold the vertical portion of optic axis 50 by 90° so that the periscope is adjusted for sighting out through the window 11 in the horizontal plane. Elevation mirror 50 is preferably pivotally mounted on member 20 for rotation about an axis through pivot point 55 and perpendicular to the plane of the paper when the components are in the position shown in FIG. 1. This axis, of course, remains perpendicular to the gimbal axis 21 and to the first portion of optic axis 50 which is parallel thereto in any position of azimuth rotation and hence always lies in or parallel to the major plane reflecting surface of mirror 51. Mirror 51 may be rotated by any convenient means (not shown) such as a miniature motor mounted on member 20 or by manual linkages. As mirror 51 is rotated about the elevation axis through pivot point 55 it will of course change the elevation look angle of the device through window 11 for any given azimuth angle in a manner which is well known in the art.

Optic axis 50 which has been folded by elevation mirror 51 extends through objective lens 52, target reticle 53, and relay optics 54 to intersect the mirror 31 of the optical path folding means on the second gimballed portion 30 at a point which will vary depending upon the azimuth angle setting of the first gimballed portion 20. The mirror 31 is preferably mounted at a 45° angle to the verticle portion of optic axis 50 as shown in FIG. 1 and is necessarily mounted at a 90° angle to the second mirror 32 which is integrally mounted with mirror 31 for rotation by member 30. The optic axis 50 is thus folded through a 90° angle by mirror 31 and is directed to mirror 32 which again folds it through 90° so that it emerges from mirror 31 in a direction antiparallel to the direction of the input portion of optic axis 50 to mirror 31. Such antiparallel emergence will result even if the angle between optic axis 50 and mirror surface 31 is varied from 45° as long as the angle between mirror 31 and 32 is kept at 90°. In any case the antiparallel output from mirror 32 then extends upwardly to the eyepiece mirror 14 which is mounted at a 45° angle to the vertical direction so as to again fold the optic axis 50 in such a fashion that it extends in the horizontal direction through eyepiece 13 for observation by the observor 16 through window 12. The objective lens 52 is designed to produce a first image at the plane of the target reticle 53 which image is transmitted by the relay optics 54 through the above noted folded path to form a second image at the focal point of eyepiece 13. This second image is transmitted to the observer by eyepiece 13.

It will be noted that the mirror assembly 31–32 has its apex, which is the line 35 of intersection of the two mirror surfaces 31 and 32, located on a projection of the gimbal center or axis of rotation 21. As noted above the mirror assembly is programmed to move about the gimbal axis 21 at one-half the rate of the relative angle between the first gimballed portion 20 and the fixed housing member 10. Referring to FIGS. 1, 3 and 4, an image 60 which is seen by the objective lens 52 on the first gimballed portion 20 is directed down the optic axis 50 which is parallel to the axis 21 of the gimballed portions and intercepts one face 31 of the mirror assembly. This mirror 31 deflects the image by 90° to the other face 32 of the mirror assembly so that it emerges along a portion of the optic axis which is parallel and oppositely directed to to the direction which the optic axis had in the first gimballed portion of the system. The image formed by the optics is now reimaged as at 61 on the fixed portion of the periscope and the image 61 has not incurred a rotation with respect to the image 60 about the line of sight or optic axis 50 due to motion of the gimballed portion 20 about the azimuth axis 21. The arrangement shown thus permits the gimbal axis or center 21 to be located in the middle of two optical paths comprising the parallel and oppositely directed portions of the optic axis 50 without interferring with these paths. The arrangement thus avoids the common problem of an optical system coming off of a gimbal wherein the optical axis of the system must coincide with the mechanical axis of rotation of the gimbal in order to avoid such image rotation. In the instant embodiment the optic axes are parallel to the gimbal axis but are not required to coincide with it.

This mode of operation is possible because the path lengths from the first gimballed portion 20 to the eyepiece mirror 14 of the fixed portion 10 through the second gimballed portion 30, 31, 32 remain constant independent of the azimuth gimbal angle. From this fact it also follows that the system may be used in converging light.

Figure 2:
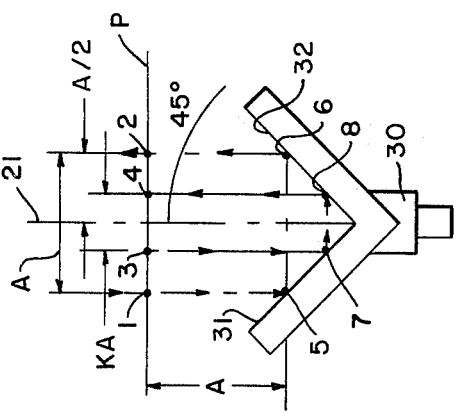
FIG. 2 is a diagrammatic view illustrating the equivalency of path lengths for any ray in an image transmitted through the path folding assembly.

The fact that the path lengths are equal through the optical path folding means 31-32 on the second gimballed portion 30 may be seen by referring to the diagram shown in FIG. 2. More particularly, FIG. 2 analyzes the optical path length of a beam of light originating at an arbitrary plane, P, which lies between the eyepiece reflecting mirror 14 and the second gimballed portion mirrors 31 and 32 and which is perpendicular to the gimbal axis 21. A beam of light originating at arbitrary plane, P, and proceeding toward the mirror 31 parallel to the gimbal axis of rotation 21 is twice reflected (once by mirror 31 and once by mirror 32) and returned to the arbitrary plane, P. This is true of any beam of light parallel to the optic axis and hence to the gimbal axis 21 which originates at the plane in such a fashion as to intercept the mirror assembly and the optical path length of any such beam is independent of its perpendicular distance from the axis of rotation 21. It should be noted that the returning beam is displaced from the axis of rotation 21 by an amount which is equal to the displacement of the original beam from the same axis. The system works in a similar manner for conical beams of light which have an axis of symmetry parallel to the axis of rotation 21 and therefore the device can be used in converging or diverging light.

That the path length from the plane P shown in FIG. 2 through the mirror assembly 31–32 and back to the plane P is the same for any beam of light may be seen as follows. Consider a beam of light parallel to the axis 21 and originating at point 1 on plane p which is located at a distance one-half A from the gimbal axis 21. For convenience, assume that the arbitrary plane P has been chosen so that the distance parallel to axis 21 of the light beam from point 1 to the surface of mirror 31 has a distance or path length A. The beam is reflected from mirror 31 to mirror 32 and is returned to intersect the plane p as discussed above at point 2 which is also located a distance A/2 from the gimbal axis 21. Since the distance between the point 5 on the surface of mirror 31 and the point 6 on the surface of mirror 32 from which this beam is reflected is equal to the horizontal distance between points 1 and 2 (by virtue of the fact that one pair of parallel lines intersected by another pair of parallel lines will have equal segments laid off thereby), the distance between points 5 and 6 is also equal to A. By similar reasoning, the distance between points 6 and 2 is equal to A. Hence, the total path length from point 1 to point 5 to point 6 to point 2 is equal to the sum of the three segments which totals 3a.

Consider now a beam parallel to the gimbal axis 21 originating at any other point 3 on plane P and being reflected from point 7 on mirror surface 31 to point 8 on mirror surface 32 and thence back to point 4 on the arbitrary plane P. The distance between points 3 and 4 in the plane P is then equal to KA where K is some arbitrary fraction of the distance A which depends upon the distance of point 3 from the gimbal axis 21.

The total path length between points 3 and 4 is then equal to $KA + 2A + 2[(A-KA/2)\text{ Tan }45°]$. But the tangent of 45, as is well known, is equal to 1 so that this total path length by simple algebraic reduction is equal to $KA + 2A + (A-KA)(1)$ which in turn is equal to 3A. That is to say, the path length between points 3 and 4 via points 7 and 8 is 3A which is equal to the path length between points 1 and 2 via points 5 and 6 which was also shown to be equal to 3A. More generally, the path length from a point on plane P of a beam of light parallel to the axis 21 through the V shaped path folding mirror assembly 31–32 and back to the plane P is the same for any such starting point. Hence, the properties of the system described above necessarily follow.

What is claimed is:

1. In an optical system of the type having a first gimballed portion of the system including objective lens means mounted for rotation about a gimbal axis, a fixed portion of the system including eyepiece lens means positioned in fixed relationship to said gimbal axis, and means to relay an optical image from said gimballed portion of said system to said fixed portion of said system in any permitted position of said gimballed portion without incurring an image rotation about the line of sight along the optic axis of said eyepiece means, the improvement comprising:

a. means to rotatably mount said first gimballed portion of said system for rotation about a gimbal axis which is parallel to and displaced from the optic axis of said objective lens means of said first gimballed portion in any position thereof so that said optic axis describes an arc of constant radius about said gimbal axis during rotation of said gimballed portion;

b. a second gimballed portion comprising optical path folding means mounted for rotation about a projection of said gimbal axis independently of said first gimballed portion and positioned to receive an image from said objective lens means which is directed therefrom in a path along said optic thereof and to fold said path so that it emerges in a direction parallel and opposed to the direction of said optical path along said optic axis of said first gimballed portion of said system and displaced therefrom, the optical path length through said optical path folding means being the same in any position of said path folding means for any point on said image;

c. image receiving means positioned on said fixed portion of said system in fixed relationship to said gimbal axis for receiving said image along said folded path from said folding means and for transmitting it through said eyepiece means; and d. means to simultaneously rotate said first gimballed portion including said objective lens of said system and said second gimballed portion including said optical path folding means at different but proportional rates such that said folding means rotates at an angular rate equal to one-half of the angular rate of rotation of said objective lens of said system.

2. A system as in claim 1 wherein said optical path folding means consists of a reflector assembly comprising two plane reflecting surfaces intersecting each other at a ninety degree angle along a line forming an apex of said assembly, said gimbal axis projection intersecting said apex line at a ninety degree angle and said optic axis of said gimballed portion intersecting one of said plane reflecting surfaces at a predetermined angle, said surface being positioned so that said optical path from said objective lens means is folded by it and is directed to said other reflecting surface which again folds it to be antiparallel to said optic axis of said gimballed portion.

3. A system as in claim 2 wherein said predetermined angle is 45°.

4. A system as in claim 1 wherein said system is a periscope and wherein said image receiving means on said fixed portion of said system is a third plane reflecting surface positioned to intercept both the optic axis of said eyepiece and said folded optical path.

5. A system as in claim 2 wherein said system is a periscope and wherein said image receiving means on said fixed portion of said system is a third plane reflecting surface positioned at 45° to and intercepting both the optic axis of said eyepiece and said folded optical path.

6. A system as in claim 1 wherein said system is a periscope and said gimballed portion of said system is mounted for at least 180° rotation in azimuth and wherein an elevation mirror is mounted ahead of said objective lens along the optical axis therethrough for rotation about an axis orthogonal by intersecting said optical axis.

7. A system as in claim 2 wherein said system is a periscope and said gimballed portion of said system is mounted for at least 180° rotation in azimuth and wherein an elevation mirror is mounted ahead of said objective lens along the optical axis therethrough for rotation about an axis orthogonal by intersecting said optical axis.

8. A system as in claim 3 wherein said system is a periscope and said gimballed portion of said system is mounted for at least 180° rotation in azimuth and wherein an elevation mirror is mounted ahead of said objective lens along the optical axis therethrough for rotation about an axis orthogonal by intersecting said optical axis.

9. A system as in claim 4 wherein said system is a periscope and said gimballed portion of said system is mounted for a least 180° rotation in azimuth and wherein an elevation mirror is mounted ahead of said objective lens along the optical axis therethrough for rotation about an axis orthogonal by intersecting said optical axis.

10. A system as in claim 5 wherein said system is a periscope and said gimballed portion of said system is mounted for at least 180° rotation in azimuth and wherein an elevation mirror is mounted ahead of said objective lens along the optical axis therethrough for rotation about an axis orthogonal by intersecting said optical axis.

* * * * *